United States Patent [19]

Kiremidjian

[11] Patent Number: 4,727,475
[45] Date of Patent: Feb. 23, 1988

[54] SELF-CONFIGURING MODULAR COMPUTER SYSTEM WITH AUTOMATIC ADDRESS INITIALIZATION

[76] Inventor: Frederick Kiremidjian, 11683 Harlan Rd., Dublin, Calif. 94566

[21] Appl. No.: 611,763

[22] Filed: May 18, 1984

[51] Int. Cl.$^4$ .................. G06F 15/16; G06F 13/22
[52] U.S. Cl. .................. 364/200; 340/825.07; 340/825.08; 340/825.52
[58] Field of Search ............ 340/825.08, 825.22, 340/825.5, 825.52, 825.07; 364/200 MS File, 900 MS File

[56] References Cited

U.S. PATENT DOCUMENTS

| | | | |
|---|---|---|---|
| 4,025,903 | 5/1977 | Kaufman et al. | 364/200 |
| 4,281,392 | 7/1981 | Grants et al. | 364/900 |
| 4,360,870 | 11/1982 | McVey | 364/200 |
| 4,468,729 | 8/1984 | Schwartz | 364/200 |
| 4,562,535 | 12/1985 | Vincent et al. | 364/200 |
| 4,622,633 | 11/1986 | Ceccon et al. | 364/200 |

Primary Examiner—Gary V. Harkcom
Assistant Examiner—David L. Clark
Attorney, Agent, or Firm—Townsend & Townsend

[57] ABSTRACT

An initial polling sequence for configuring a modular computer system employing a system bus for interconnecting the CPU and various modules attached to the bus. At the beginning of the polling sequence, a bus base address register in each module is preset to a port 0 address by the CPU. A POLL signal is generated by the CPU and intercepted by the closest module, which responds by placing a module identification character on the data lines of the system bus. The CPU receives the module identification character, stores this character in a table and issues a bus base address for that module. Upon receipt of the bus base address, the module presently active in the polling sequence issues a POLL command to the next module on the system bus. The poll sequence is repeated until all modules have been assigned and have received a bus base address.

8 Claims, 15 Drawing Figures

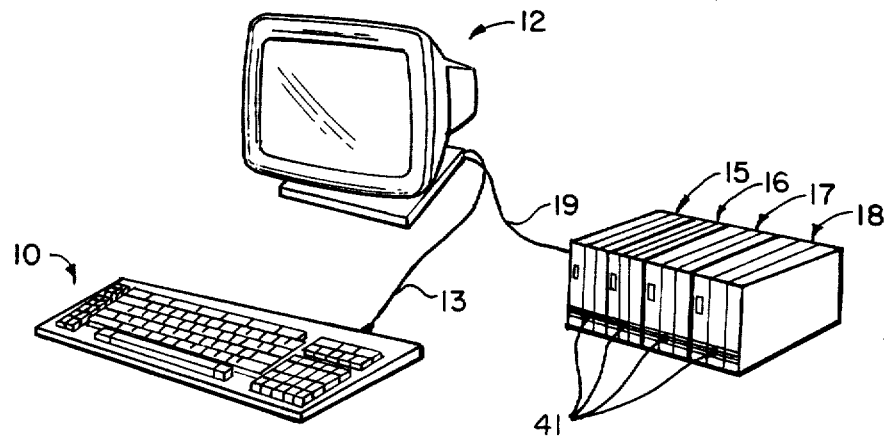
FIG._1.
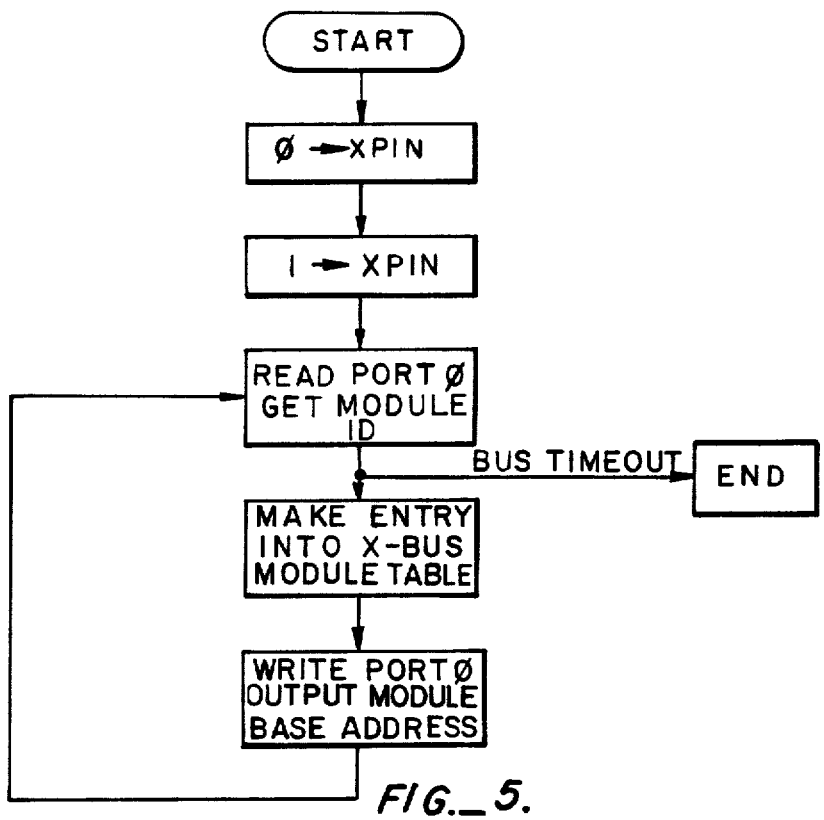
FIG._5.

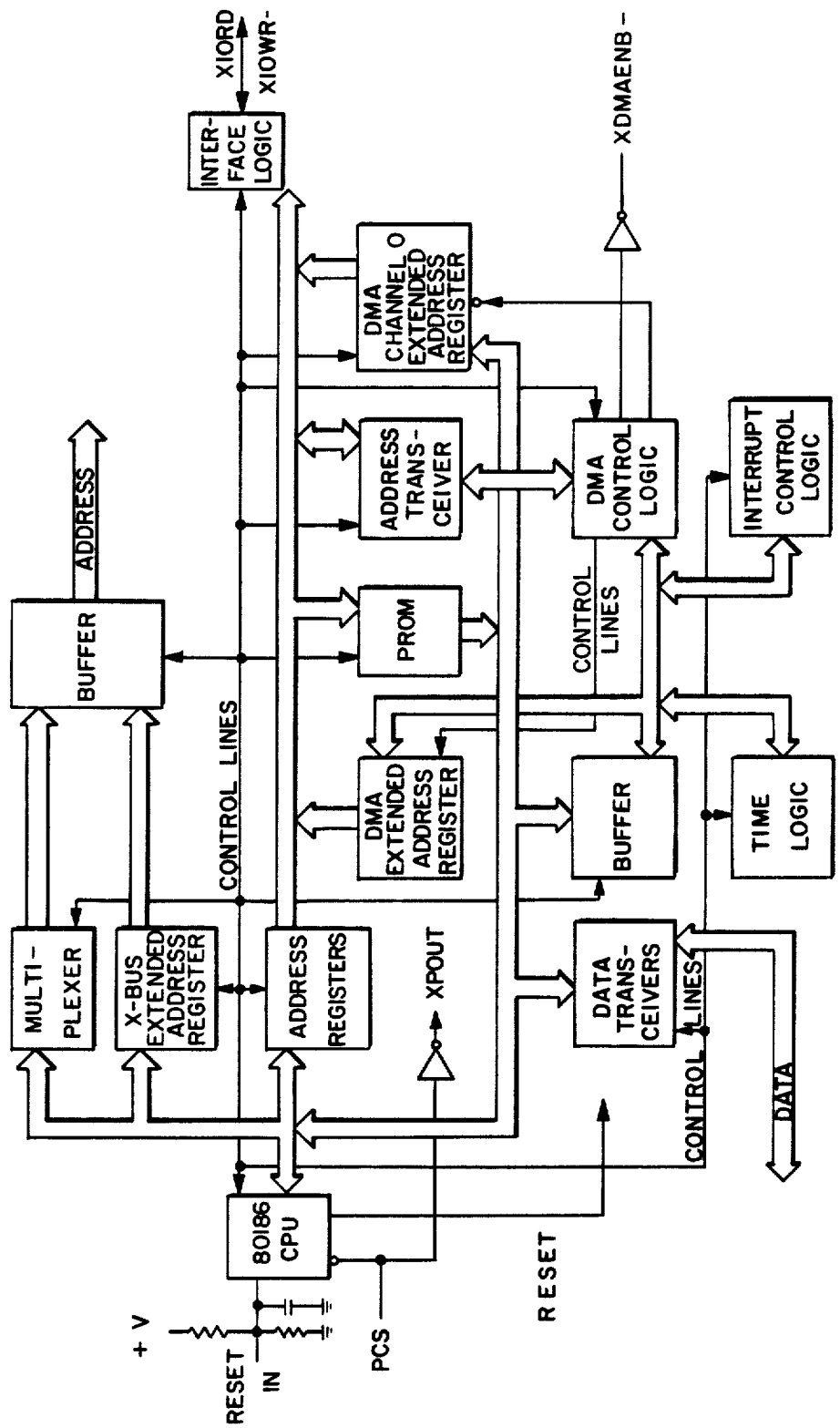
FIG._2.

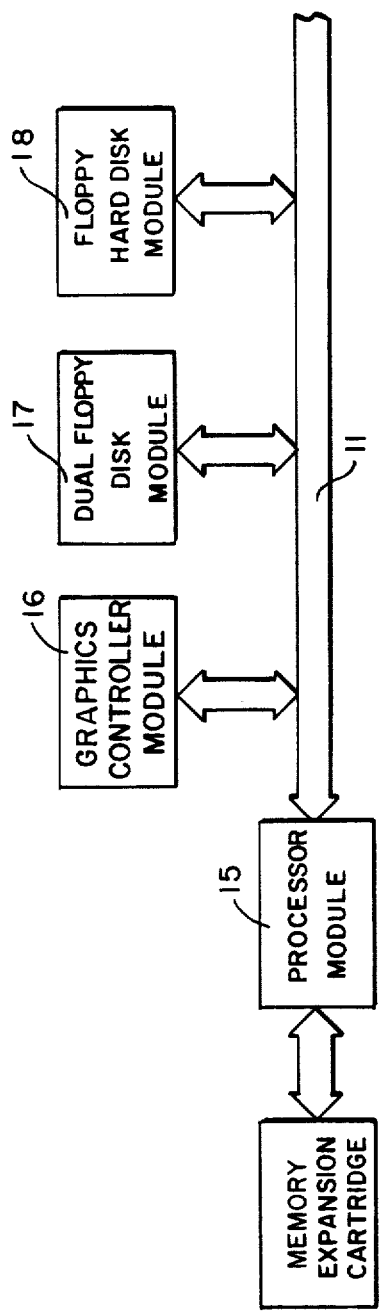
FIG._3.

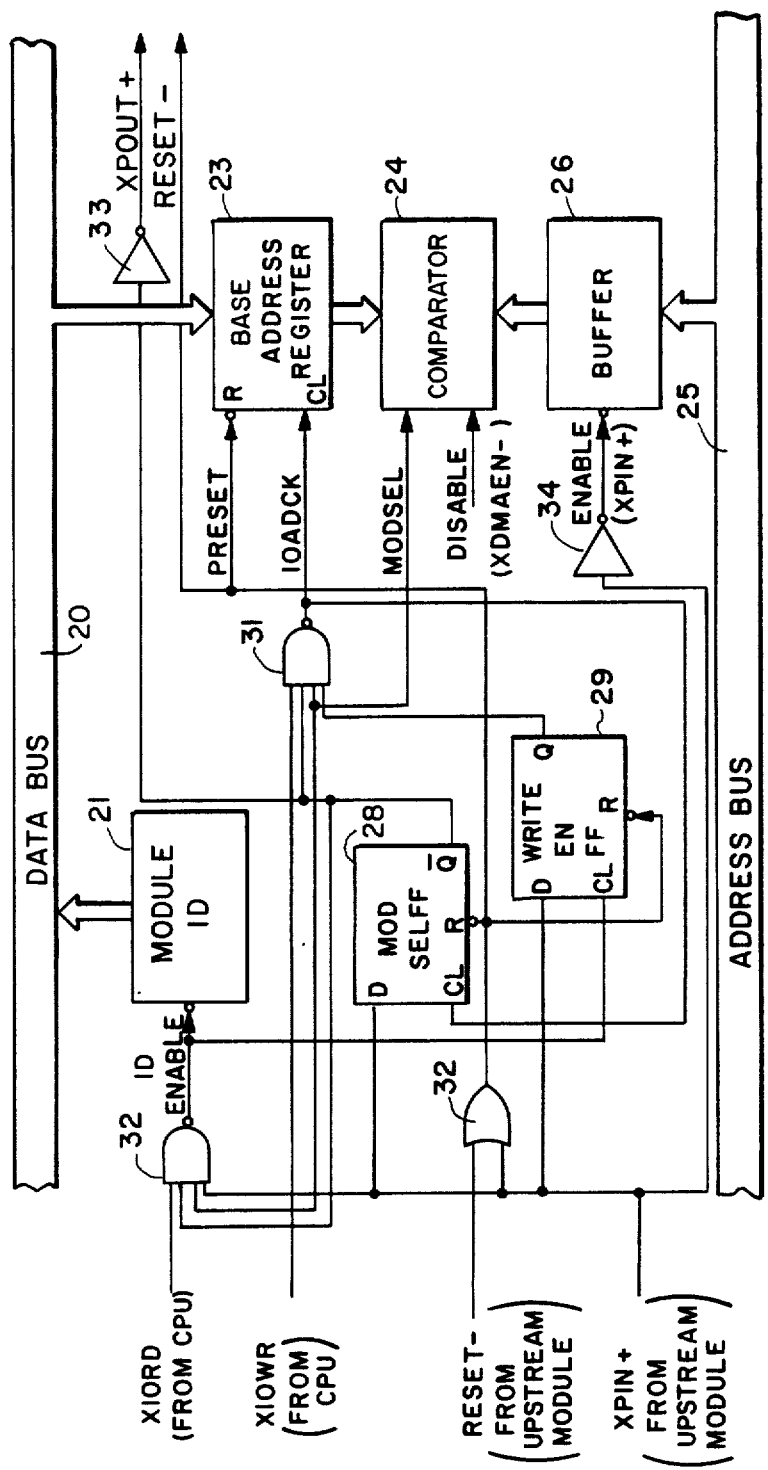
FIG.—4.

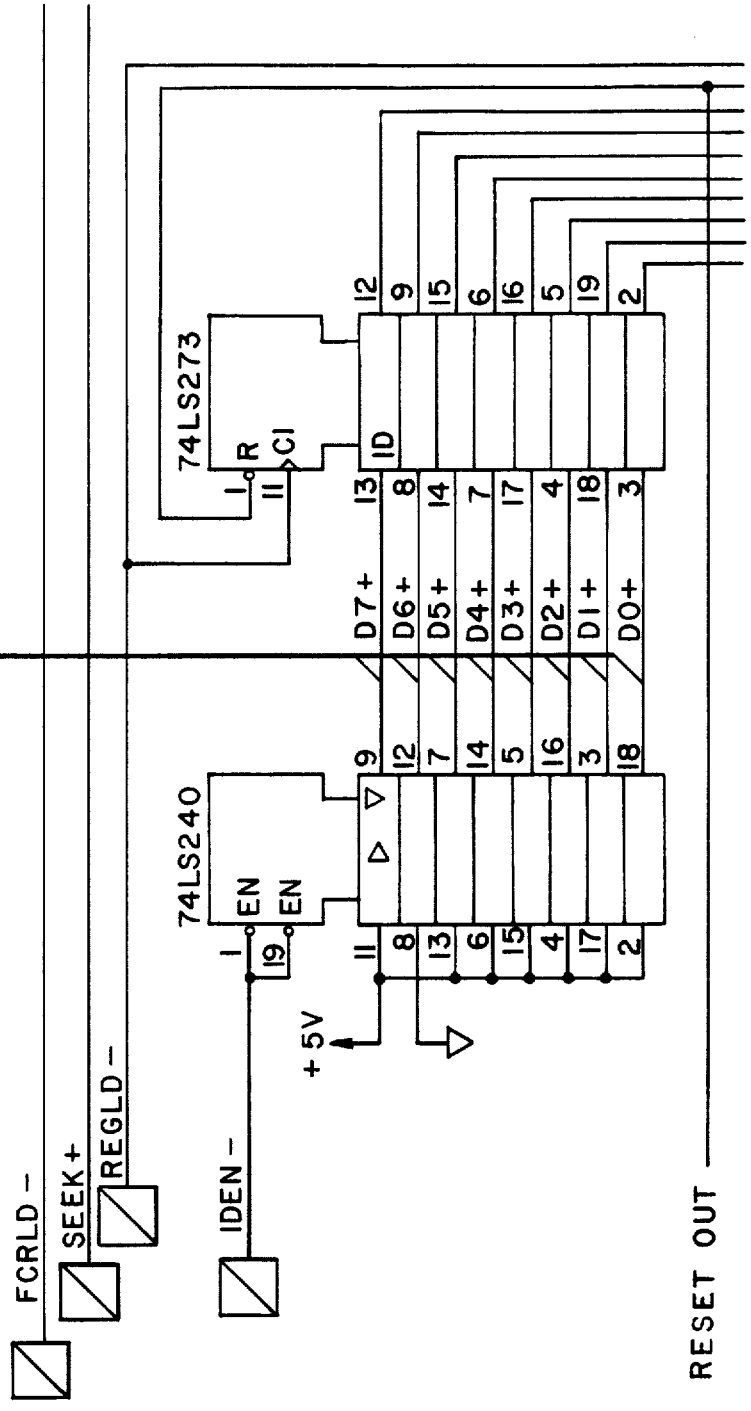

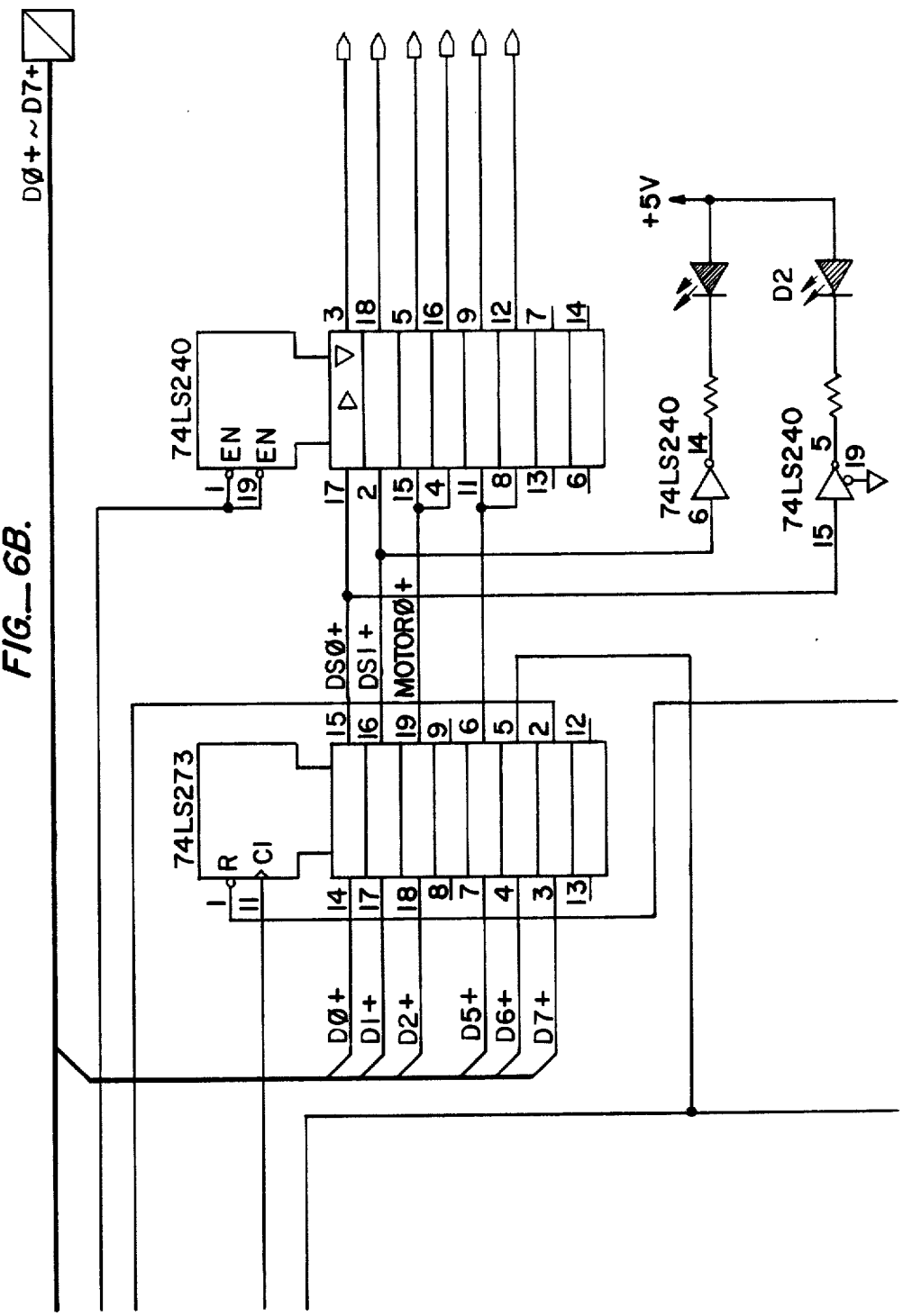
FIG.—6B.

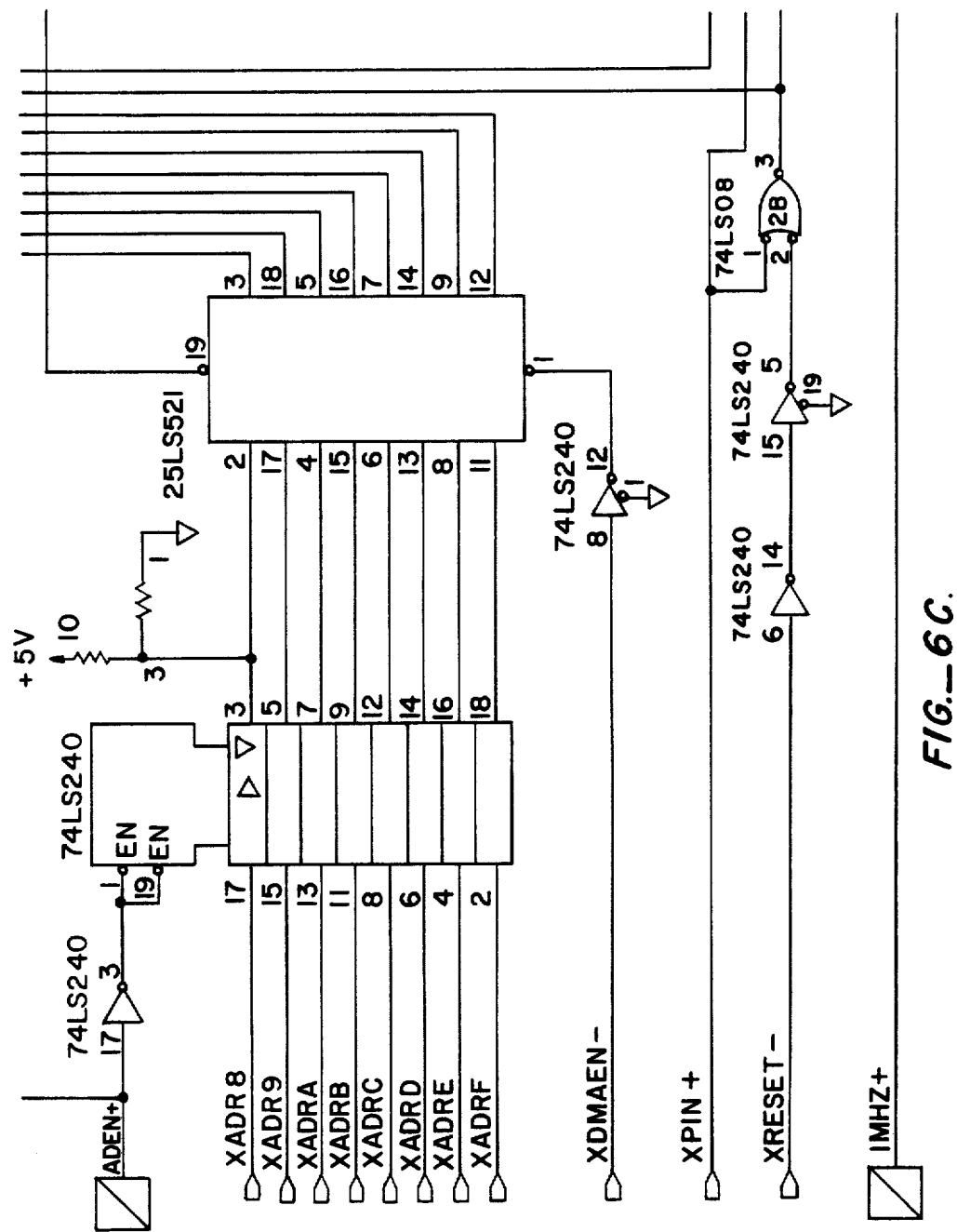
FIG._6C.

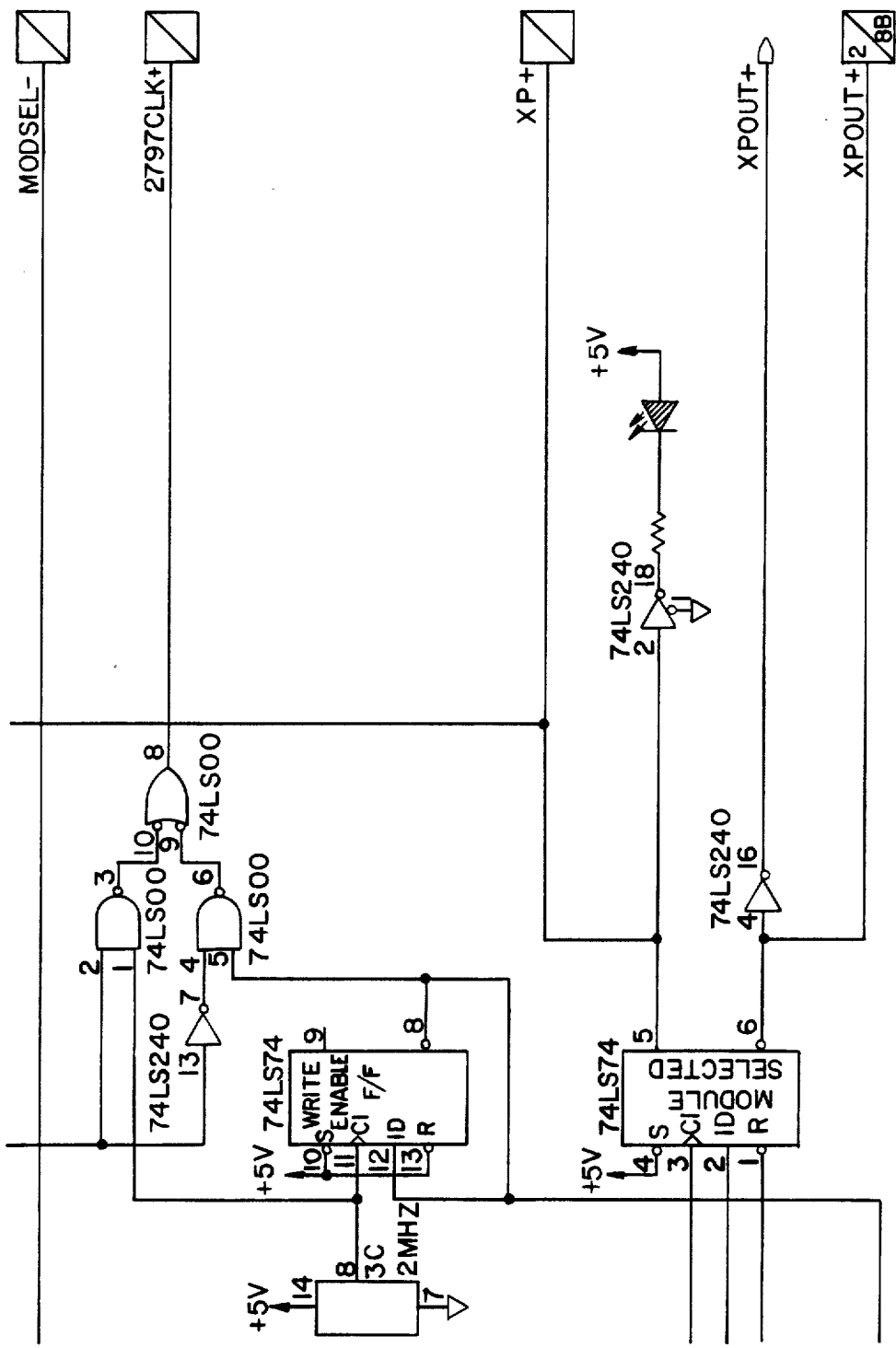
FIG.—6D.

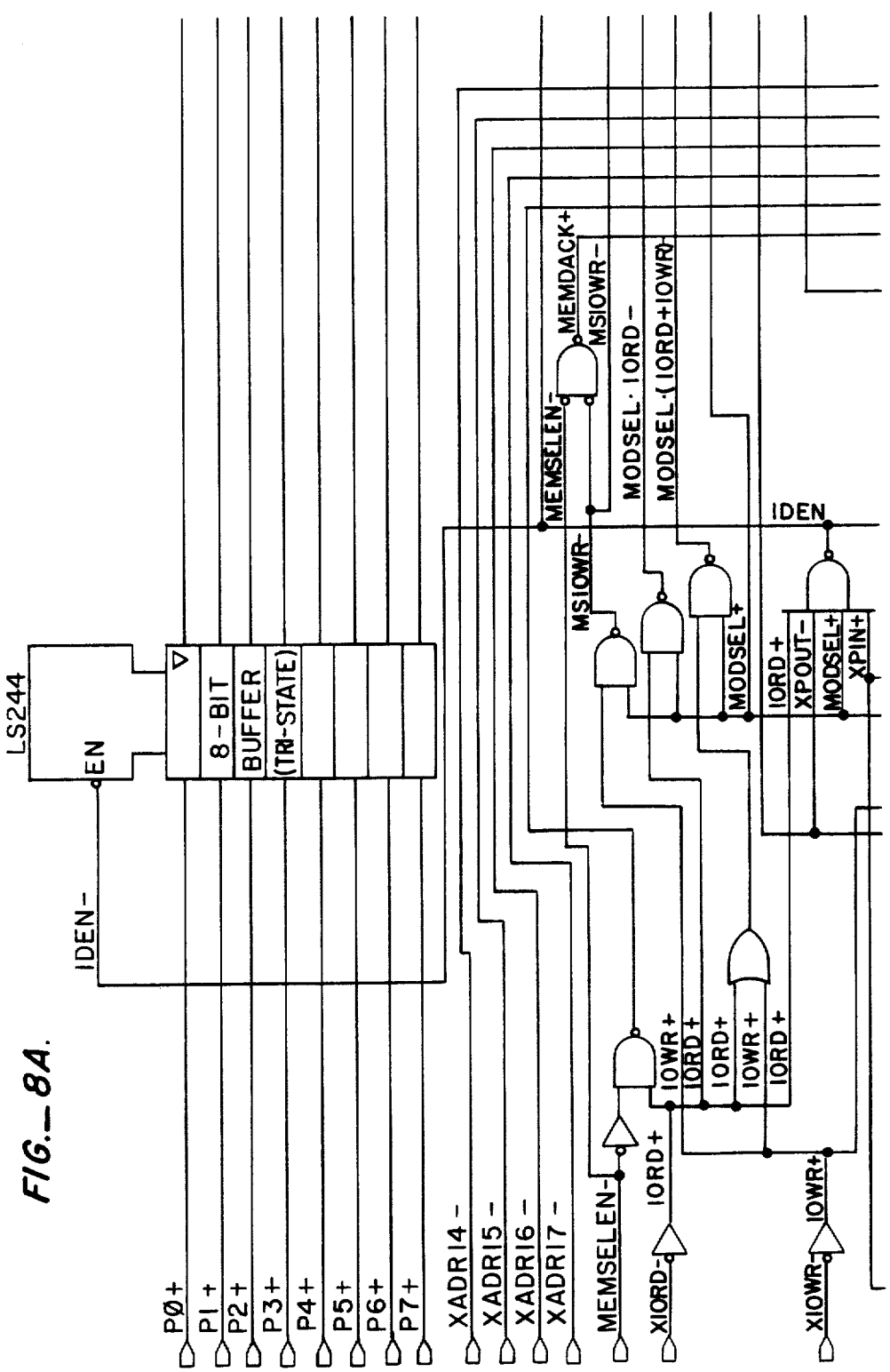
FIG._8A.

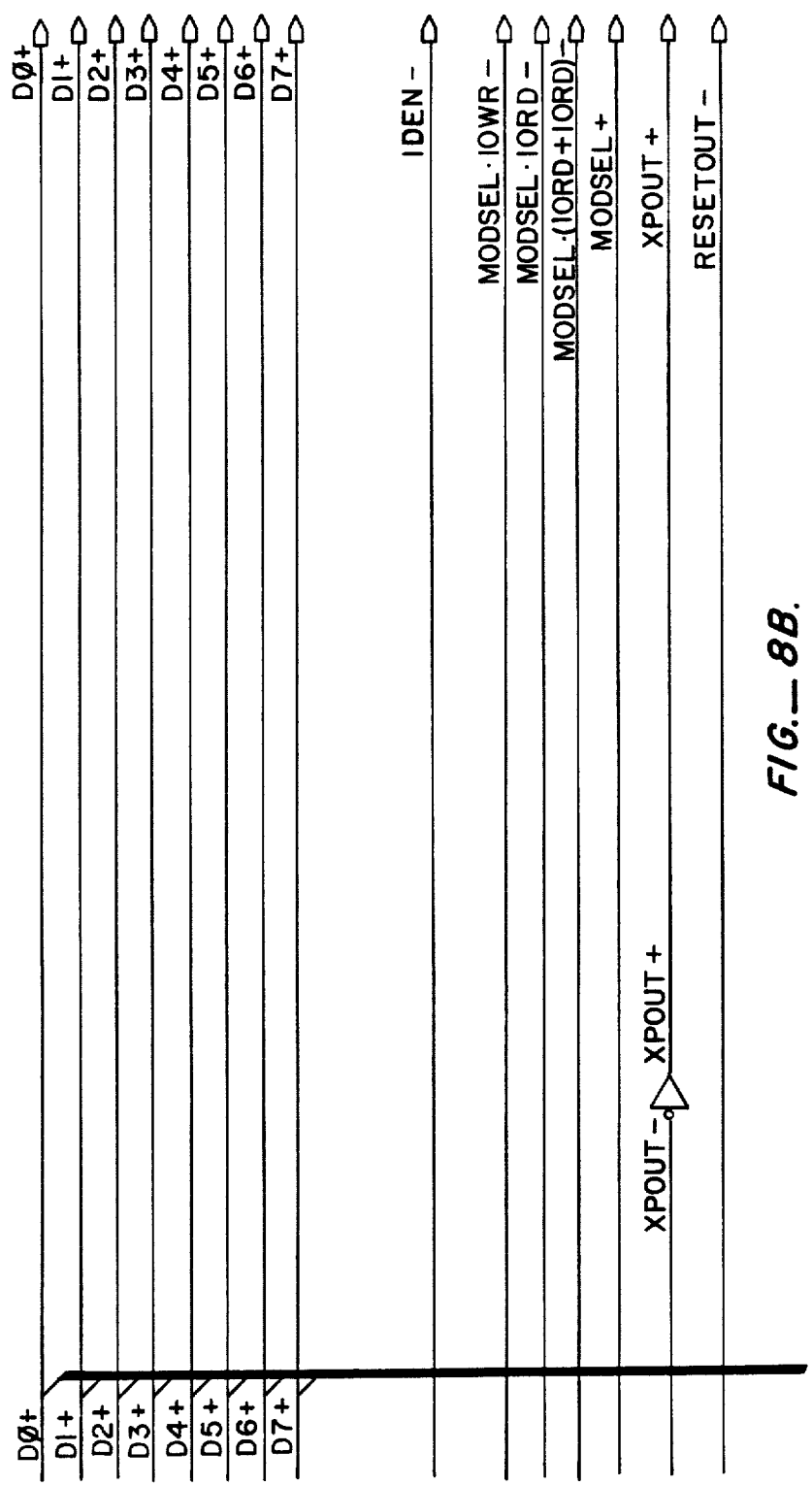
FIG._8B.

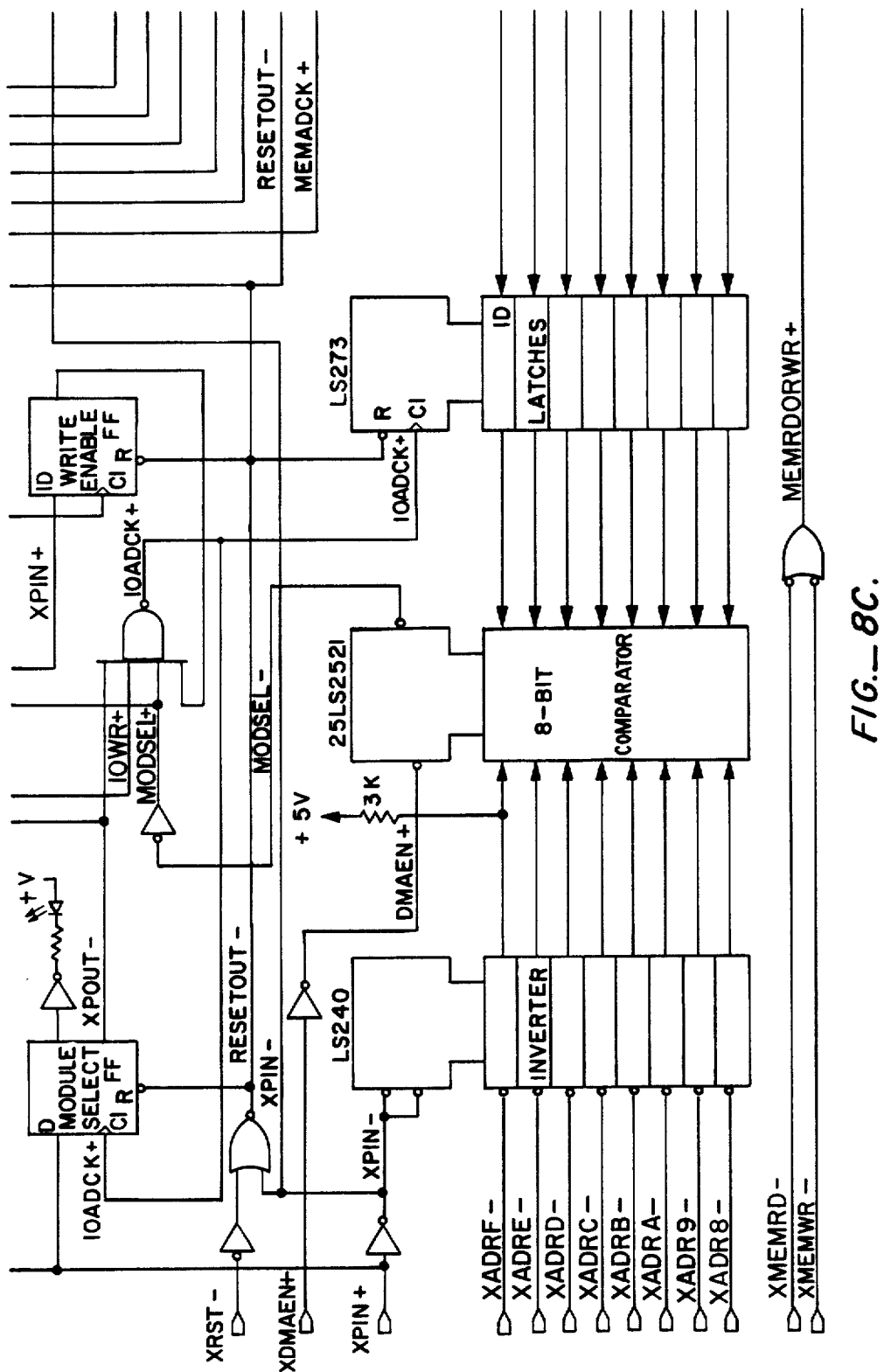
FIG.—8C.

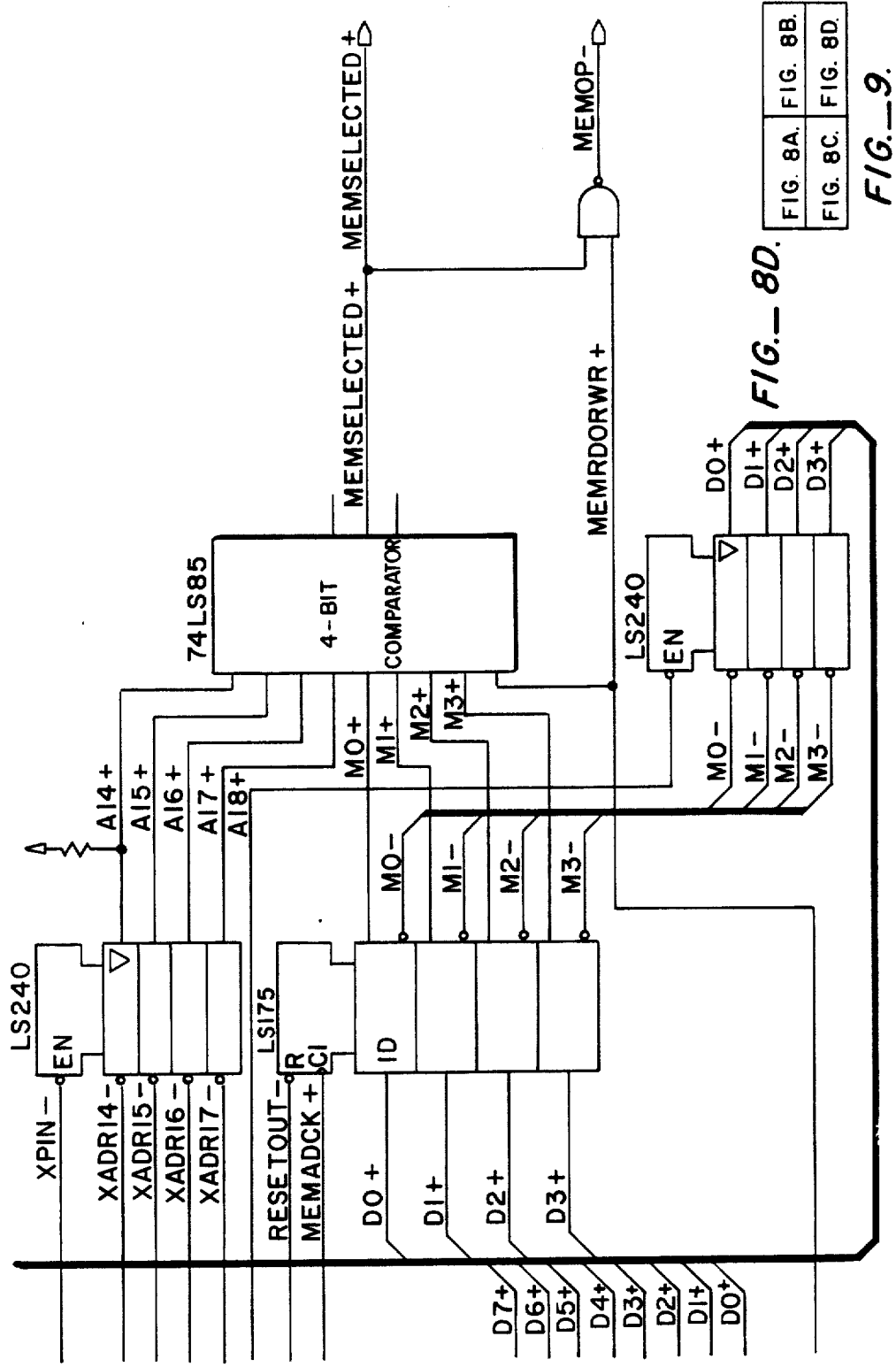

SELF-CONFIGURING MODULAR COMPUTER SYSTEM WITH AUTOMATIC ADDRESS INITIALIZATION

BACKGROUND OF THE INVENTION

This invention relates to computer systems in which peripheral units are interconnected with a CPU via an I/O bus.

Many computer systems are known which employ a bus arrangement for enabling communication between a CPU and peripheral units, such as floppy disk or hard disk storage devices. Such systems all require some arrangement or technique for identifying which particular peripheral units are attached to the bus and for assigning bus addresses to individual units uniquely, in order to avoid conflict or ambiguity during I/O read and write operations.

With the increasing popularity of computers for business office and home uses, the trend in the design of computer systems has been to simplify the initial system set up procedure and also to facilitate reconfiguration of the system, for example by replacement of a limited storage device at a subsequent time by a storage device of greater capacity or by adding on more storage devices to an initial basic system configuration. Whenever such a system is initially set up, and also when such a system is reconfigured, an initial routine is typically provided in order to determine that each connected device has been allotted memory location on the bus and also to determine that each device is operational. This procedure normally requires that the bus-connected devices have a switch selectable bus base address in order to fit into the memory scheme imbedded into the computer system. Such an arrangement lacks flexibility and is difficult for non-skilled users to implement in the field, which frequently necessitates initial set up by a skilled technician.

SUMMARY OF THE INVENTION

The invention comprises an automatic initialization technique for assigning base bus addresses to modular units connectable to a computer system bus which automatically assigns proper base bus addresses to attached modules regardless of the module type and irrespective of the physical location of the module on the bus.

From a method standpoint, in a broadest aspect the invention comprises the steps of initially setting the bus address of each of a plurality of modules connected to an expansion bus to a predetermined bus address value; serially polling each module attached to the bus with a predetermined bus address character matching the predetermined bus address value; and assigning a different bus address to each module. The steps of serially polling each module and assigning a different bus address character thereto are sequentially performed on each module, beginning with the module in closest physical proximity to the CPU and continuing sequentially in the order of increasing distance from the CPU.

The step of setting the bus address of each connected module to a predetermined bus address value is preferably implemented by including a bus address register in each module and presetting each bus address register to the predetermined bus address character value, the value preferably being the port 0 bus address. Each module is also provided with a module identification character generator, and the step of polling preferably includes the steps of reading each module identification character from the module and storing each module identification character in a master list.

From a different method aspect, the invention comprises a method of automatically configuring the bus addresses of a plurality of modules connected to a computer bus, each module having a bus address register and a module identification character, the method comprising the steps of presetting the bus address register in each module to a predetermined value; reading the module identification character from a module; assigning a bus character value to the module read during the step of reading; and repeating the step of reading and assigning for successive modules until each module has been identified and assigned a different bus address. The successive reading and assigning steps are performed by propagating an interrogating signal on a control path extending serially through each module; while the step of assigning includes the steps of storing the assigned bus address character in the base address register of the module, and blocking the propagation of the interrogating signal from a preceeding module to a succeeding module until the assigning step is completed for the preceeding module.

From an apparatus standpoint, the invention comprises a module for use in a computer system having a CPU, a plurality of modules, and a bus, the module including presettable means for storing a bus address applied to the computer system bus by the CPU; means for presetting the storing means to a predetermined value in response to receipt of a RESET signal from a control line in the system bus; means for comparing the bus address in the storing means with an address placed on the system bus address lines by the CPU and generating a COMPARE signal when the two addresses agree; means responsive to the receipt of a module POLL control signal from an intermodule control line for enabling the storing means to store a bus address present on the system bus data lines after the storing means has been preset and the comparing means has generated the COMPARE signal, the enabling means including means for generating a POLL control signal for coupling to an intermodule control line; and means responsive to the enabling means for preventing alteration of the contents of the storing means until receipt of another RESET signal. The module further includes means for generating a module identification character in response to receipt of a READ signal from a system bus control line and an POLL control signal from an intermodule control line.

From a limited system standpoint, the invention comprises a computer system having a CPU, a plurality of removable modules, and a bus for enabling communication among the CPU and the modules, the bus having data, address and control lines including a READ control line and a WRITE control line for common connection between the CPU and modules and intermodule control lines for serial interconnection of RESET and POLL control signals between modules.

Each module includes a register for containing a modifiable address for that module, the register having an input coupled to the bus data lines and an output coupled to a first input of a comparator. The comparator has a second input coupled, preferably via a buffer, to the bus address lines for comparing the register contents with an incoming address and generating a compare signal when the incoming address corresponds to the register address.

A plurality of input terminals are coupled individually to the bus READ and WRITE control lines and the RESET and POLL intermodule control lines from the preceeding module; while a pair of output terminals are coupled individually to the RESET and POLL intermodule control lines leading to the succeeding module.

Means are coupled to the RESET input terminal for presetting the module register to a predetermined value, preferably the port 0 address, when a RESET signal is received from a preceeding module, the presetting means also being employed to couple the received RESET signal to the reset output terminals.

First and second bistable means are provided, each having an input coupled to the POLL input terminal, a reset input coupled to the RESET input terminal, a clock input and an output, each bistable means being reset when a RESET signal is received from a preceeding module. The output of the first bistable means is coupled to the POLL output terminal and serves as a POLL control signal for the succeeding module when the bistable means is set.

A first logic means has a plurality of inputs coupled individually to the READ input terminal, the output of the first bistable means, the comparator output and the POLL input terminal for generating a clock signal for the second bistable means when all control signals input to the first logic means are valid in order to toggle the second bistable means to the set state.

A second logic means has a plurality of inputs coupled individually to the WRITE input terminal, the output of the first bistable means, the output of the comparator and the output of the second bistable means for generating a clock signal for the module register when all control signals input to the second logic means are valid in order to write an address present on the bus data lines into the register.

The output of the second logic means is coupled to the clock input of the first bistable means in order to toggle the first bistable means after the bus address has been written into the module register, so that the first and second logic means are disabled to prevent alteration of the contents of the module register and the first bistable means provides a POLL signal for the succeeding module until the first bistable means is reset.

Each module further includes a module identification character generator having an input coupled to the output of the first logic means and an output coupled to the bus data lines for placing a module identification character on the bus data lines when the first logic means generates the clock signal for the second bistable means.

Each module further includes a visible indicator means coupled to the first bistable means for illumination when the first bistable means is in the set state, signifying that the given module has been assigned a bus base address.

By providing the automatic polling for modules on an on-line basis, initial set up of a modular computer system is greatly facilitated. Further, no particular technical skill is required in order to completely configure the system. In addition, the time required to physically install the individual modular components of the computer system and render the system operational is substantially reduced by the automatic polling provided by the invention.

For a fuller understanding the for the nature and advantages of the invention, reference should be had to the ensuing detailed description taken in conjunction with the accompanying drawings.

BRIEF DESCRIPTION OF THE DRAWINGS

FIG. 1 is a schematic diagram illustrating a modular computer system incorporating the invention;

FIG. 2 is a functional block diagram of the processor portion of the CPU module of FIG. 1;

FIG. 3 is a schematic diagram illustrating the bus-module connection arrangement;

FIG. 4 is a block diagram of the polling elements incorporated into the modules of the FIG. 1 system;

FIG. 5 is a flow chart illustrating the polling sequence;

FIGS. 6A–6D illustrate a first specific embodiment of the module polling logic;

FIG. 7 is a diagram illustrating the interrelation of FIGS. 6A–6D;

FIGS. 8A–8D are logic diagrams of a second specific embodiment of the polling logic; and FIG. 9 is a diagram illustrating the interrelation of FIGS. 8A–8D.

DESCRIPTION OF THE PREFERRED EMBODIMENTS

Turning now to the drawings, FIG. 1 illustrates a modular computer system incorporating the invention. As seen in this Fig., the computer system includes a keyboard 10 for enabling operator input and control to the system, a CRT display 12 coupled to the keyboard 10 by means of interconnection cable 13, and a plurality of individual modules 15–18 arranged side by side. The left-most module 15 in the array is the CPU module, which is connected to the CRT display 12 by means of cable 19. The CPU module preferably incorporate an Intel type 80186 microcomputer and the block diagram of the processor board incorporated into module 15 is shown in FIG. 2.

Modules 16–18 may comprise any one of a number of different modules, such as a graphics controller module, a dual floppy disk module, a hard disk module, a floppy/hard disk module or the like. For simplicity, the power supply connections have been omitted from all the Figs.

The individual modules 15–18 are interconnected by means of a bus 11 as shown in FIG. 3. Bus 11 comprises a plurality of internal conductors not visible in FIG. 3 and incorporates the usual bus address lines, bus data lines, and bus control lines. The preferred arrangement for mechanically and electrically interconnecting modules 15–18 is illustrated in commonly assigned copending U.S. patent application Ser. No. 493,089, filed May 9, 1983 for "Modular Housing For Computer System", now U.S. Pat. No. 4,501,460 issued Feb. 26, 1985 the disclosure of which is hereby incorporated by reference. Generally described, the interconnection technique permits all modules to be readily interconnected both mechanically and electrically by means of mating male and female complementary plug and socket connections which are incorporated into the side walls (hidden from view in FIG. 1) of the individual module housings. This arrangement, when combined with the conventional removable cabling interconnections afforded by cables 13 and 19, permits persons with minimal technical skills to initially set up a computer system configuration, such as illustrated in FIG. 1. The invention disclosed herein enables the computer system, upon power up or reset (either automatically or manually), to identify which particular modules are physically incorporated into the system, and to assign unique bus addresses for each particular module actually attached to the bus.

With reference to FIG. 4, each module connected to the right of the CPU module 15 incorporates initial polling logic of the type illustrated in block diagram form in this Fig. As seen in FIG. 4, a module identification unit 21 has an output coupled to the data bus 20. Module identification unit 21 is preferably a read only device, such as a plurality of hard wired connectors coupled to a corresponding plurality of tri-state buffers, or any other suitable type of read only device. Unit 21 is enabled to read out a unique module identification code, which is a multibit code in the preferred embodiment, in response to the appearance of an enable signal designated ID ENABLE, which is generated in the manner described below.

Each module incorporating the logic shown in FIG. 4 also includes a base address register 23 having a data input which is also coupled to data bus 20, and an output coupled to one input of a comparator 24. The other input to comparator 24 comprises a multibit address placed on address bus 25 by the CPU within CPU module 15 in the manner described below. A buffer 26 is incorporated between the address bus 25 and the comparator 24.

Control signals supplied to the polling logic in each module 16–18 include an input/output read signal designated XIORD, an input/output write signal designated XIOWR and a comparator disable signal designated XDMAEN. The XIORD signal is the standard I/O read signal employed in all read operations in the system, while the XIOWR control signal is the standard I/O write control signal used in the computer system. The XDMAEN control signal is used to disable comparator 24 during direct memory access (DMA) operations in the manner described below.

Two input control signals are supplied to each module via the intermodule connection lines from the preceeding module immediately upstream: these two signals are RESET and XPIN. Two control signals are supplied by each module via the intermodule connection lines to the downstream or succeeding module. These signals are RESET and XPOUT. Thus, the XPIN and RESET control input signals for module 17 of FIG. 1 are the XPOUT and RESET signals from upstream module 16 of FIG. 1. The plus and minus symbols used in connection with some of the control signals illustrated in FIG. 4 indicate the active level. Thus, XPIN is active when in the relatively high state, while RESET is active when in the relatively low state.

The polling logic in each downstream module includes a module select flipflop 28 and a write enable flipflop 29, each of which in the preferred embodiment are D type flipflops. The module select flipflop 28 has a data input D coupled to the XPIN control input terminal, a clock input CL coupled to the output of an inverting AND gate 31, a reset input R coupled to the output of an OR gate 32, and a $\overline{Q}$ output coupled as one input to NAND gate 31, NAND gate 32, and the input of an inverter 33. The two inputs to the OR gate 32 are the RESET signal and the XPIN signal from the upstream module. The output of inverter 33 comprises the XPOUT signal, which serves as the XPIN signal to the downstream module.

Write enable flipflop 29 has a data input D also coupled to the XPIN control signal, a clock input CL coupled to the output of NAND gate 32, a reset input R coupled to the output of OR gate 32 and a Q output coupled as an input to NAND gate 31. The remaining inputs to NAND gate 31 are the XIOWR write control signal, and the output of comparator 24 designated MODSEL, which is active whenever the two addresses supplied to the comparator 24 match.

The remaining inputs to NAND gate 32 comprise the XPIN signal, the MODSEL signal and the XIORD read control signal from the CPU.

The XPIN control signal is also coupled via an inverter 34 as an enable signal to buffer 26.

The output of OR gate 32 is also coupled to the reset input R of register 23, and to an output terminal for supplying a RESET signal to the downstream module.

The XDMAEN disable signal is coupled to the enable input of comparator 24 and serves to disable the comparator 24 during DMA operations, during which an erroneous MODSEL signal may be inadvertently generated.

In operation, upon power up after initial configuration of the system of FIG. 1, the RESET signal is automatically generated by the CPU and furnished to the module 16 immediately to the right of the CPU module 15. The appearance of the RESET signal causes the two flipflops 28 and 29 to be RESET and the register 23 to be reset to an all zero configuration, corresponding to the port 0 address. The reset signal is passed on to the succeeding downstream module 17, where the same reset transactions occur, and then to module 18. Consequently, upon power up all flipflops are reset and all base address registers are preset to address zero (port 0). The same reset action can be manually effected by operator manipulation of a machanical reset button, which is preferably mounted on the back panel of the CPU module 15.

After reset, the polling operation proceeds as follows. With reference to FIGS. 4 and 5, the CPU pulls the XPIN control signal low momentarily (to ensure reset of at least the first downstream module 16 elements), and next raises the XPIN signal to the active state. Thereafter, the CPU issues a read port 0 command, which results in the appearance on address bus 25 of the port 0 address and the generation of an XIORD read control signal. Since register 23 of the first downstream module 16 was previously preset to the port 0 address, the comparator 24 generates a MODSEL signal which qualifies NAND gate 32 (since XPIN, MODSEL FF, $\overline{Q}$ are all active) to pass the read command and generate an ID ENABLE signal, which results in the reading out of the module identification character from unit 21 onto data bus 20. This module identification character is received by the CPU and stored in a section of memory reserved for a table of module identification characters and bus address assignments.

Generation of the ID enable signal clocks the write enable flipflop 29, which qualifies NAND gate 31 (since MODSEL and MODSEL FF $\overline{Q}$ are active) to pass the next IXIOWR write command and generate an IDADCK clock signal for register 23. Prior to the generation of the write command by the CPU, an assigned base bus address is placed by the CPU on data bus 20, and this base address is thus clocked into register 23 when the IDADCK clock signal is generated. The IDADCK clock signal clocks flipflop 28 to the set state, which removes the modsel FF $\overline{Q}$ enabling signal from NAND gates 31 and 32, thereby disabling both gates until flipflop 28 is subsequently reset. In addition, after the base address is clocked into register 23, the upper input to comparator 24 changes to a non-zero value with a result that the MODSEL comparator output signal goes inactive.

At the beginning of the polling sequence, flipflop 28 was reset, and the $\overline{Q}$ output of flipflop 28 inverted by inverter 33 caused the XPOUT signal to be at the inactive level, thereby preventing any downstream modules from participating in the polling sequence. At the end of the polling sequence performed in module 16, however, the flipflop 28 is set, which changes the XPOUT signal to the active state, thereby permitting the next downstream module to become actively involved in the polling sequence.

With reference to FIG. 5, the I/O read/write polling sequence continues for each succeeding downstream module, with the CPU placing each successive module identification character in the CPU table and issuing a base bus address for that module. When the last module in the chain has received a base address, the next successive read command from the CPU to the chain of modules will result in no return of a module identification character (since all modules now have a base address other than 0). After a predetermined time out period, the CPU thus recognizes that all modules have been accounted for.

To assist the operator in ascertaining that the polling sequence has been completed for each module, an indicator 41 (FIG. 1) is provided on the front panel of each module 15-18. Indicators 41 are preferably driven by a signal generated by one of the two outputs of the module select flipflop 28. One possible arrangement is illustrated in FIG. 6D in which the Q output from the flipflop is used to drive a light emitting diode 41 through an inverter. Other arrangements will occur to those skilled in the art.

FIGS. 6A-D and 8A-D illustrate two different specific configurations of modules employing the automatic polling sequence described above. Other equivalent arrangements will occur to those skilled in the art.

At any time after initialization of the system through the polling sequence just described, the system can be automatically reconfigured by entering the routine illustrated in FIG. 5, toggling the XPIN intermodule control line and performing the read port 0/write port 0 sequence. Similarly, after power down and subsequent power up, the same automatic polling sequence can be automatically conducted, and the same sequence may be initiated by manual operation of the reset switch. Thus, the system can be reconfigured at will.

While the above provides a full and complete disclosure of the preferred embodiments of the invention, various modifications, alternate constructions and equivalents will occur to those skilled in the art. For example, although each register 23 is specifically described as being preset to the port 0 bus address at the beginning of the polling sequence, each register may be configured to preset to some other bus address, so long as the preset address is dedicated to the polling sequence. Therefore, the above descriptions and illustrations should not be construed as limiting the scope of the invention, which is defined by the appended claims.

What is claimed is:

1. A computer system having a CPU, a plurality of removable modules and a bus for enabling communication among said CPU and said modules, said bus having data, address and read and write control lines for common connection between said CPU and said modules, and reset and poll intermodule control lines for serial interconnection between modules, each said module including:
a register for containing a modifiable bus address for that module, said register having an input coupled to the bus data lines and an output;
a comparator having a first input coupled to said register output, a second input coupled to the bus address lines for comparing the register contents and an incoming address, and an output for generating a compare signal when the incoming address corresponds to the register address;
a plurality of input terminals coupled respectively to the bus read and write control lines and the reset and poll intermodule control lines from the preceeding module;
a pair of output terminals coupled respectively to the reset and poll intermodule control lines leading to the succeeding module;
means coupled to the reset input terminal for presetting the register to a predetermined value when a reset signal is received from a preceeding module and for coupling the received reset signal to the reset output terminal;
first and second bistable means each having an input coupled to the poll input terminal, a reset input coupled to the reset input terminal, a clock input and an output, each said bistable means being reset when a reset signal is received from a preceeding module, the output of said first bistable means being coupled to the poll output terminal and serving as a poll signal for the succeeding module when said first bistable means is set;
first logic means having a plurality of inputs coupled individually to the read input terminal, the output of said first bistable means, the comparator output and the poll input terminal for generating a clock signal for said second bistable means when all control signals input to said first logic means are valid to clock said second bistable means to the set state;
second logic means having a plurality of inputs coupled individually to the write input terminal, the output of said first bistable means, the output of said comparator and the output of said second bistable means for generating a clock signal for said register when all control signals input to said second logic means are valid to write a bus address present on the bus data lines into said register;
the output of said second logic means coupled to the clock input of said first bistable means to clock said first bistable means to the set state after the bus address has been written into said register, whereby said first and second logic means are disabled to prevent alteration of the contents of said register and said first bistable means provides a poll signal for the succeeding module until said first bistable means is reset.

2. The invention of claim 1 wherein the predetermined preset value is zero.

3. The invention of claim 1 wherein each said module further includes a buffer having an input coupled to said bus address lines, an output coupled to said second input of said comparator, and an enabling input coupled to said poll input terminal.

4. The invention of claim 1 wherein each module further includes a module identification character generator having an input coupled to the output of said first logic means and an output coupled to said bus data lines for placing a module identification character on said bus data lines when said first logic means generates said clock signal.

5. The invention of claim 1 wherein each module further includes an inverter coupled between the output of said first bistable means and the module poll output terminal.

6. The invention of claim 1 wherein each module further includes an OR gate having a first input terminal coupled to the module reset input terminal, a second input terminal coupled to the module poll input terminal, and an output terminal coupled to the reset inputs of said first and second bistable means, the reset input of said register and the module reset output terminal.

7. For use in a computer system having a CPU, a plurality of modules, and a bus for enabling communication among the CPU and the modules, the bus having data lines, address lines, control lines for common connection between the CPU and the modules, and intermodule control lines for serial interconnection between modules attached to the bus; an improved module comprising:

presettable storing means for storing a bus address;
means coupled to said storing means for presetting the storing means to a predetermined value in response to receipt of a RESET signal from a first intermodule control line;
means coupled to said storing means for comparing the bus address in the storing means with an address on the bus address lines and generating a COMPARE signal when the two addresses agree; and
means coupled to said storing means and said comparing means and responsive to receipt of a module POLL control signal from a second intermodule control line for enabling said storing means to store a bus address present on the bus data lines after said storing means has been preset and said comparing means has generated the COMPARE signal, said enabling means including means for generating a POLL control signal to be coupled to another intermodule control line and means for preventing alteration of the contents of said storing means until receipt of another RESET signal from said first intermodule control line.

8. The invention of claim 7 wherein said improved module further includes means for generating a module identification character in response to receipt of a READ signal from a bus control line and a POLL control signal from an intermodule control line.

* * * * *